2,722,651

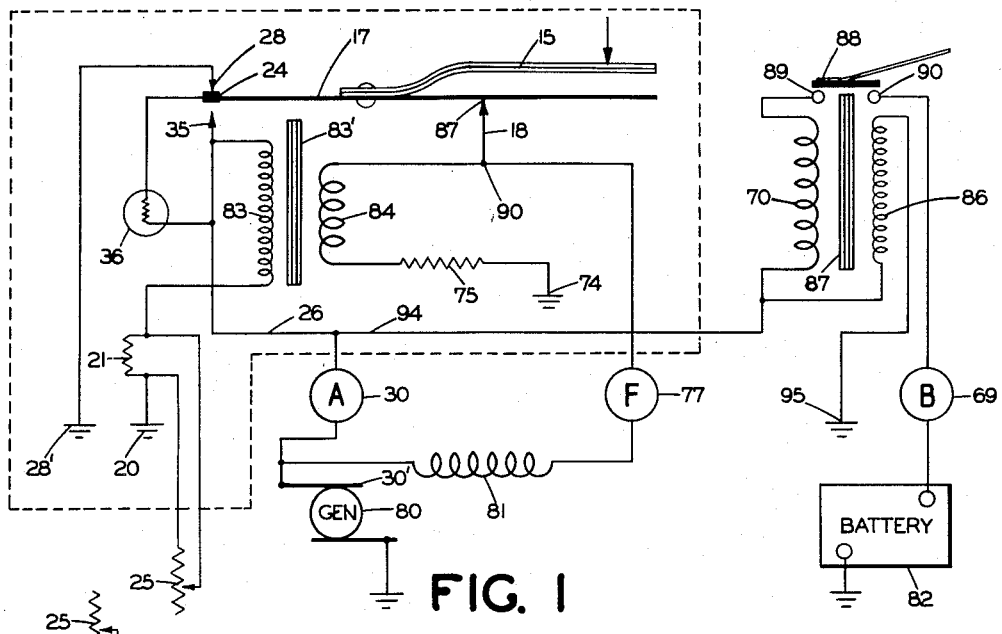
FIG. 1
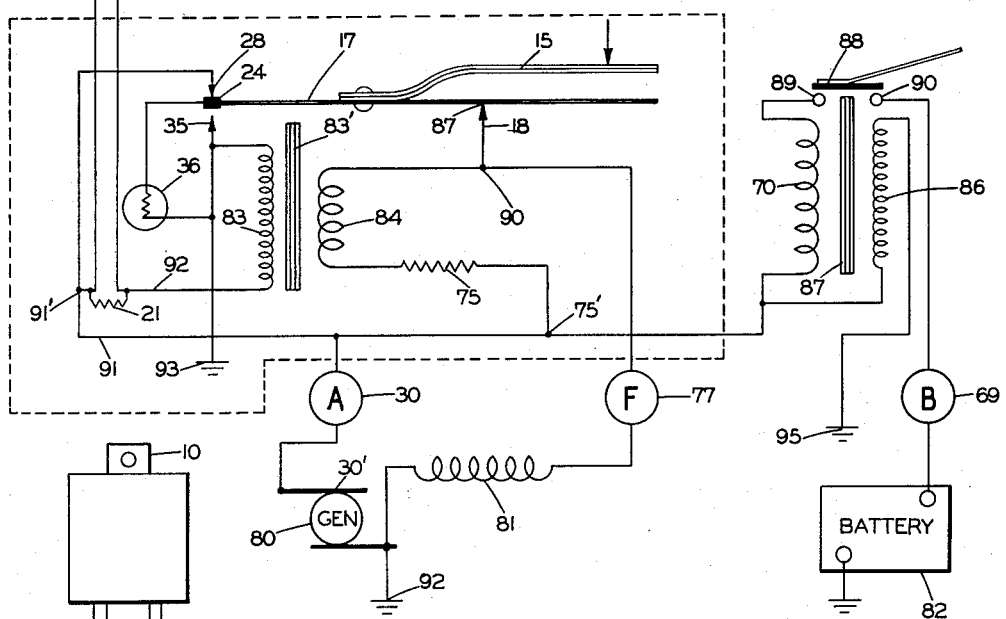
FIG. 2
FIG. 3
INVENTOR.
Petter Kuhar
BY
Ebes J. Hyde
ATTORNEY United States Patent Office 2,722,651
Patented Nov. 1, 1955

ELECTRIC GENERATOR REGULATOR

Petter Kuhar, Cleveland, Ohio

Application April 15, 1950, Serial No. 156,170

13 Claims. (Cl. 322—25)

This invention pertains to regulating means and systems and, more particularly, to a regulating circuit for a vehicle having a generator.

This invention is related to my invention shown, described and claimed in my application Serial Number 23,793, filed April 28, 1948, for Electric Regulating Device and System, now Patent No. 2,657,351, issued on October 27, 1953, to which reference may be made for constructional details of the device.

At the present time only a relatively few garages specializing in ignition work stock all of the regulators needed to repair any kind of an automobile as a large number of types would be needed. As many as 25 or 30 types would be required for a reasonably complete stock.

An object of the present invention is to provide an automobile regulator device which will greatly reduce the types needed to be stocked for servicing almost any make of automobile, and to this end the device of this invention is produced in two types, and these two types are replaceable in practically all types of automobiles. Thus, not only the garages specializing in ignition work but all general garages and almost all gasoline stations can keep a small supply of these two types of regulators, and at very low investment can do ignition repair work. It is, accordingly, an object of this invention to provide a regulator for automobiles and the like in which one of two embodiments will fit on almost every kind of automobile now on the road no matter what year that car was made.

An object of the present invention is to provide a regulating device especially adapted for use with vehicles having generators for charging a storage battery which is inexpensive yet very rugged in its construction and which will so regulate the system as to voltage and current that the battery will have a very long life.

A further object of the invention is to provide a regulating device which is readily adjustable by the operator.

Another object of the invention is to provide a potentiometer type regulating device for vehicles and the like.

For a better understanding of the present invention, together with other and further objects thereof, reference is had to the following description taken in connection with the accompanying drawings, and its scope will be pointed out in the appended claims.

Figs. 1 and 2 are circuit diagrams of regulating devices operating in accordance with the invention, and Fig. 3 illustrates one of the devices of the invention and shows its connections for wiring it into the circuit of an automobile.

In one aspect this invention is directed to a regulating circuit for a vehicle which comprises a generator having a field coil in circuit to ground and a resistor in shunt with the field coil.

In another aspect, the invention is directed to an electrical contact device wherein there are first and second spaced apart stationary electrical contacts which are bridged by a movable contact mounted on a lever arm so that a force greatly increased by leverage is exerted between the movable contact and either one or the other of the fixed contacts to break them apart in the event they are stuck together.

This invention is broadly applicable to systems wherein a generator device is utilized to charge a storage battery, and reaches its maximum usefulness in vehicles such as automobiles and trucks. Accordingly, the following description of the invention is in relation to a vehicle installation, although the scope of the invention is not limited thereto.

In the past, the electrical regulators which have been installed in automobiles generally include a current control, a voltage control and a reverse current control whereby current to and from the battery is regulated and the voltage in the system is maintained within certain limits. Each make of car has had its own regulator, and changes are made in these regulators as new car models are brought out from year to year. Accordingly, there is a very wide variety of regulators on the road at the present time, and a motorist needing a new regulator must go either to an ignition specialist or to a garage specializing in his make of car in order to be fairly sure of getting the proper regulator. This means that unless a garage stocks a large variety of regulators, they must turn down repair work of this nature.

A further disadvantage which has grown up with the ignition trade is that the current control, voltage control and back current control devices are built into one single indivisible unit and when anything goes wrong with any section of the device an entire new unit must be purchased and installed. This, of course, increases materially the cost to the motorist over the cost of installing only that portion of the regulator which is defective.

The device of the present invention comprises a regulator incorporating all three of the basic functions of a regulator in an inexpensive manner, with superior performance than existing devices, and at a lower cost, yet the device is so universal that only two embodiments need be stocked by a garage in order to service all popular cars now on the road. Further, a portion only of the device of this invention is incorporated as a separate small unit for replacing the voltage control section of all existing regulator devices, thereby enabling any garage or service station man to quickly replace the voltage control section of the regulator on any car. Only two embodiments of this voltage control section need be stocked, and the service man need not be a highly skilled ignition man because one of the embodiments will work only on one type of automobile ignition system and the other embodiment will work only on the other type of ignition system. If the service man makes a mistake in selecting the proper control section the car battery will not charge. He then puts the other type in place and everything will operate successfully.

The voltage regulating section is the portion of the regulator which most often fails. Very seldom do the current control or back current control sections fail to operate. Thus, by providing a separate voltage control section a very large percentage of all regulator failures can be repaired.

A further notable advantage of the device of the invention is that it is very easy to install on any car.

With reference to the drawing, a car equipped with a regulator having the circuit shown in Fig. 1 operates in the following manner: When the engine is started by connecting battery 82 to a starter, not shown, the generator 80 begins to generate as the engine picks up speed. Before the generator is rotating at a speed sufficient to build up a high generator voltage, current flows from the generator brush 30' to the armature lead 30, through the conductor 26, through the coil 83, and through the variable resistor 25 to ground at 20. This establishes an electromagnetic field through the soft iron core 83' tending to open the contacts 24, 28. Current also flows from generator brush 39' through the generator field winding 81 to the field lead 77, to the point 90, through conductor 18 to the pivot point contact 87, thence through the armature 17 and contacts 24, 28 to ground at 28'. Current also flows from the generator 80 through line 94 through the coil 86 and down to ground at 95.

The armature 17 is mounted for vibratory motion about point 87 as a pivot, as is more completely described in my previous application, and the armature is biased by a bimetallic member 15 whose bias is a function of temperature.

As the generator 80 speeds up, the increased flow of current through coil 83 causes armature 17 to be more strongly attracted to the soft iron pole piece 83', thereby separating contact 24 from contact 28. Immediately upon separating, the direct low resistance path 81, 77, 18, 17, 24, 28 to ground at 28' is broken and current flows from point 90 through the relatively low resistance coil 84 and resistor 75 to ground at 74. Flow of current through coil 84 establishes an electromagnetic field around the soft iron core 83' which is in opposition to the field established by coil 83 and tends to close contacts 24, 28. Thus contact 24 can be made to pull away from or go toward contact 28, and in normal operation the armature 17 vibrates rapidly between these two positions. If the battery 82 is in poor condition, the contact 24 will stay against the contact 28 longer and as the condition of the battery improves, the contact 24 will begin to vibrate against contact 28 so that it is not in engagement with it continuously. When the condition of the battery is normal, the contact 24 will float between contacts 28 and 35 without touching either of them a very great proportion of the time.

When a battery voltage is too high, the contact 24 will vibrate against contact 35. When contact 24 closes against contact 35, the generator field 81 is momentarily shunted out as field coil 81 is in parallel with variable resistor 25 to ground. Contact 24 does not at any time stay against contact 35 for an extended period of time. It continues to vibrate, and the higher the battery charge the greater the percentage of time the two contacts will be in engagement, and the lower the charging rate of the generator will be due to the reduction of the generator field set up by coil 81. The bulb 36, connected to the contact 24 and to the line 26, serves as an arc quencher to prevent a spark from being drawn as contact 24 moves away from contact 35. This removes the possibility of the two contacts sticking together.

An arc quenching circuit is provided to prevent the contact 24 from sticking to the contact 28. This circuit is comprised of the armature 17, line 18, coil 84 and resistor 75 to ground at 74. When contact 24 is spaced from both contacts 28 and 35 field coil 81 is in series with coil 84 and resistor 75 to ground.

There exists a relatively high resistance path from the generator 80 through lead 30, through coil 83 and the variable resistor 25 to ground at 20.

When contact 24 breaks away from contact 28 and before it engages contact 35 there is established a high resistance path from generator 80 through field coil 81, lead 77, coil 84, and resistor 75 to ground at 74. Due to the drop in current through this path, the field coil excitation is materially reduced, with consequent lower generator output.

When the generator output is still too high, the contact 24 will momentarily engage the contact 35. This shunts the generator field 81 with a very low resistance path from lead 30, through line 26, line 17, line 18 to point 90, and lead 77 thereby further reducing the field excitation. Under this circuit condition the high resistance 75 keeps the output from battery 82 from being connected to ground at 74 through a low resistance circuit thus limiting the drain on the battery. When contacts 24 and 35 are closed a very low resistance circuit is established from point 77 to point 30, which is the same as from point 90 to point 30. Two paths are connected in parallel from this low resistance circuit to ground. The first path is of low resistance and includes coil 84 and resistance 75 to ground at 74, the second path is of higher resistance and includes coil 83, resistors 21, 25 to ground at 20.

When contacts 24 and 35 are in engagement the flux established by coil 84 bucks the field of coil 83 tending to neutralize it, thereby permitting the contacts to open easily.

Under low load and at its rated voltage the make and break of contacts 24 and 35 is rapid, but contact 24 does not engage contact 28. When the load builds up, 24 may engage 28.

It will be seen, therefore, that a resultant electromotive force set up by the flow of current through the two coils 83, 84 determines the position of the contact 24. The spacing between contacts 28 and 35 for a normal automobile installation is between six and eight thousandths of an inch and when the battery is very low, contact 24 will engage and stay against contact 28. As the battery condition improves, the contact 24 vibrates against contact 28 to reduce the battery charging rate. If the battery is over-charged, contact 24 will vibrate against contact 35 to reduce the field excitation on the generator 80, thereby greatly reducing the generator output.

When 24 and 28 engage each other a low resistance path to ground at 28' is established, reducing to nearly zero the current through coil 84 and removing almost all of the field which bucks the field established by coil 83. This causes a much greater pull to be exerted on 24 tending to return it toward 35.

When the flux from coil 83 reaches a high enough value it breaks 24 from 28 and the current in the field circuit flows through 84 and 75 to ground causing coil 84 to establish a magnetic field which bucks the field established by coil 83. This tends to cause contacts 24 and 28 to come together again. This is done at a very rapid rate. The higher the load requirement the longer contact 24 is in engagement with 28. When the generator voltage is below the rated voltage of the regulator, 24 and 28 stay in engagement continuously until the generator voltage comes up to the rated voltage. Then they start to make and break slowly and as the voltage builds up they vibrate faster and faster until 24 begins to engage 35. If the voltage continues to rise 24 engages 35 at a higher and higher rate until the preset voltage limit is reached.

The size of coil 84 helps to determine the spacing between 28 and 35. The larger the coil the larger the gap can be. The larger the gap the wider the range of regulation which may be obtained. Whether coil 84 is large or small it acts as a suppressor for any arc which forms, particularly any arc between 28 and 24.

When the generator 80 picks up speed sufficient to charge the battery 82, the circuit to ground through coil 86 establishes an electromagnetic field around the soft iron core 87 which pulls the contactor 88 down against the two contact points 89, 90, thereby making a circuit from the generator 80 through the battery connecting terminal or lead 69 to the battery 82.

The double contact points 89, 90 are very important to trouble-free long life of the regulator. In the usual single contact arrangement a spark occasionally welds the two points shut thereby causing trouble. With the construction of the present invention, as the contactor 88 engages the first point, number 89 for example, no spark is drawn because there is no circuit through contactor 88 and point 90 as 88 and 90 are not yet in engagement. As the contactor 88 touches contact 90, the circuit is completed and a spark may jump. If this spark welds contactor 88 to the contact 90 it does not have serious consequences. When the generator 80 stops, reverse current from battery 82 through coil 70 tends to open the switch 88, 89, 90 and the contact point 89 will not stick to the contactor 88, there having been no spark between the two when they came into engagement. This breaks the circuit and assures that there will be no current drain on the battery. The contactor 88 is spring biased away from the contact points 89, 90 so that when the current flow through coil 70 is reversed an electromagnetic force is set up which helps the spring to pull away the one end of the contactor 88. This separating force tends to pry the one end of the bar 88 away from the contact point 90, thereby greatly multiplying the effective separating force to the extent that even if bar 88 is welded to contact point 90 they must separate.

As the generator 80 is driven still faster after the contactor 88 is in engagement with contacts 89, 90 the increased flow of current through coil 70 establishes an electromagnetic field which pulls the contactor 88 down even harder against the contacts 89, 90 thereby improving the contact so that it can handle the increased current without arcing.

The variable resistor 25 is in series with the voltage control coil 83 whereby the flow of current to ground at 20 may be varied thereby to adjust the vibratory action of the armature 17 and influence the operation of the regulating circuit. As the value of resistor 25 is increased, the flow of current to ground at 20 decreases, thereby decreasing the magnetic pull of pole piece 83' on armature 17. This reduces the time during which contact 24 is away from contact 28 and increases the flow of current through the low resistance circuit comprised of generator field coil 81 through line 18 and armature 17 to ground at 28'. This keeps the generator field excitation high and keeps the generator output up. By a reverse action, lowering the value of resistor 25 reduces the field excitation with consequent reduction in the output from the generator 80.

The variable resistor 25 is preferably mounted within the car near the driver so that the driver can change the charging ratio of the system. In contrast to previous systems, once the driver sets the variable resistor 25 the regulation of the system is then automatic, and when the battery is suitably charged the control operates to automatically reduce the charging.

Preferably the variable resistor 25 is shunted by a resistor 21 whose resistance is high compared to the resistance of resistor 25. The resistor 21 keeps the generator from running away should the wire to the variable resistor 25 be broken. In the absence of fixed resistor 21 the contact 24 would engage contact 35 and stay there, there being no ground connection to coil 83 to establish a magnetic force tending to repel the armature 17. With the connection 24, 35 made and with no circuit to ground at 20 a large current will flow through field coil 81 to ground at 74 thereby increasing the field excitation with consequent increased generator output through field coil 81, etc., until the generator burned out. Resistor 21 prevents this by providing a circuit through coil 83 to ground at 20, and the current flow when it increases too much establishes a magnetic field forcing contact 24 away from contact 35.

The circuit shown in Fig. 2 is similar to the circuit of Fig. 1 insofar as the cut-out pulling coil 83, the contactor 88, and the contacts 89, 90 are concerned. It is also similar in its operation when the generator stops.

The action of the vibrator is somewhat different. As the generator 80 starts to operate, current flows to the armature lead 30, through line 91 to contact 28, thence through contact 24 to line 17, to points 87 and 90, to the field lead 77 and then through coil 83 to ground at 93. The current through coil 83 establishes an electromagnetic field in the core 83' which tends to open contacts 24, 28.

With contacts 24, 28 open, current then flows from the generator 80 to point 75', through resistor 75, coil 84, the field lead 77 and the field coil 81 to ground at 92. Resistor 75 is sufficiently large to cause a drop in the generator field with a consequent reduction in the output from the generator. Current through coil 84 establishes an electromagnetic field on the armature 17 which opposes the field set up by coil 83.

An important advantage of the device of this invention is that a very small, compact, inexpensive device can be built incorporating only that portion of either of the circuits shown in Figs. 1 and 2 for replacement in an automobile. For example, the device may include only the portion shown within the dotted line in Fig. 1, or that portion shown within the dotted line in Fig. 2.

When the voltage control function of an automobile regulator is not operating correctly, a replacement unit in accordance with this invention is substituted by merely disconnecting the old field terminal. The unit, shown as a box in Fig. 3 and shown in detail within the dotted lines in Figs. 1 and 2, is then mounted adjacent the old regulator by means of a bolt through the hole in the metal tab 10 which grounds the device. The field connector 77 is then connected electrically to the old field circuit of the generator and the armature connector 30 of the new section is connected to the old armature connector without breaking the old connection. The regulator with a new voltage control section is then in operating condition. A slight adjustment of the variable resistor in order to obtain the proper charging ratio might be needed. For convenience the voltage control device shown in Fig. 3 is provided with field and armature connectors which are 18 inches long. This enables the service man to mount the regulator at practically any location on the back of the dash board panel.

The entire device is a wattage regulator in one unit. Heretofore voltage and current have been regulated by separate sections. In the present device both voltage and current are simultaneously controlled in a single section.

Previous devices used practically the total generator current output to control the current generated. The present device uses only a small part of the generator current for regulation, thereby permitting the use of smaller coils.

While there have been described what are at present considered to be the preferred embodiments of this invention, it will be obvious to those skilled in the art that various changes and modifications may be made therein without departing from the invention, and it is, therefore, aimed in the appended claims to cover all such changes and modifications as fall within the true spirit and scope of the invention.

What is claimed is:

1. A regulating circuit for a vehicle comprising, in combination: a generator having a field coil always connected in series circuit to ground, a vibratory make and break switch including a pair of contacts connected to said grounded circuit, a voltage control coil always connected from said generator output to ground in parallel with said field coil for vibrating said switch, and a variable resistor in series with said voltage control coil.

2. Regulating circuit for a vehicle as set forth in claim 1, further characterized by a resistor connected across said pair of contacts to prevent sparking therebetween as said contacts are broken apart.

3. A regulating circuit for a vehicle as set forth in claim 1, further characterized by said variable resistor being mounted in an extension cord.

4. In a regulator for automatically regulating the output of a generator; a vibratory contact connected in the output from said generator; a first series circuit connected from the output of said generator to ground without influencing said vibratory contact and including a voltage control coil; a second series circuit connected from the output of said generator to ground and including a current control coil for vibrating said contact to regulate the output from said generator; and a resistor always connected to ground in series with said current control coil.

5. In a regulator for automatically regulating the output of a generator: a vibratory contact; a current control series circuit connected to the output of said generator and including means for vibrating said contact; a voltage control series circuit connected to the output of said generator for generating a field for influencing the vibratory characteristics of said contact, said voltage control series circuit comprising two resistors connected to ground in parallel with each other, and means for varying one of said resistors.

6. In a regulator for automatically regulating the output of a generator; a vibratory contact; a current control circuit connected to the output of said generator and comprising a coil and a resistor connected in series and always connected to ground; a voltage control series circuit connected to the output of said generator for generating a field for influencing the vibratory characteristics of said contact, said voltage control series circuit comprising two resistors connected directly to ground in parallel with each other, and means for varying one of said resistors.

7. In a regulating circuit for a transportation device having an electrical generator; a vibratory contact; a current control series circuit including coil means connected to the output of said generator for exerting an alternating field on said contact to cause said contact to vibrate; a voltage control series circuit including a coil connected to the output of said generator generating a field for influencing the vibratory characteristics of said contact; said voltage control series circuit including in series with said voltage control coil a fixed resistor and a variable resistor, said variable resistor being located within the operator's compartment of said transportation device and being electrically connected in parallel with said fixed resistor.

8. In a regulating circuit: a generator having a field coil and a first and a second series circuit in the output of the generator, both said first and second series circuits comprising a coil and a resistor always connected to ground for controlling arc and current in said output circuit and a circuit comprising a make and break switch connected to ground in parallel with both of said series circuits, said switch being actuated by magnetomotive force set up by only one of said coils.

9. A regulating circuit for a vehicle as set forth in claim 8, further characterized by means for varying the value of the resistor in one of said series circuits.

10. A regulating circuit for a vehicle as set forth in claim 8, further characterized by said first series circuit controlling voltage, and further characterized by means for varying the value of the resistor in said first series circuit, said second series circuit controlling current.

11. In a regulator for automatically regulating the output of a generator: a vibratory contact; a current control circuit connected to the output of said generator and comprising a coil and a resistor connected in series and always connected to ground; a voltage control series circuit connected to the output of said generator for generating a field for influencing the vibratory characteristics of said contact, said voltage control series circuit comprising resistor means connected to ground, and means for varying the value of said resistor means.

12. A regulator as set forth in claim 11, further characterized by second resistor means always connected from said vibratory contact to the output circuit from said generator to reduce the arcing at said vibratory contact.

13. In a regulator for automatically regulating the output of a generator for a vehicle; a vibratory make and break contact device; electromagnetic core means adjacent said contact device for vibrating it; circuit means connecting said vibratory contact device to the output from said generator; a current control series circuit connected to the output of said generator and including coil means adjacent said electromagnetic core means for influencing the vibratory characteristics of said contact device; a voltage control series circuit connected to the output of said generator and including a voltage control coil adjacent said electromagetic core means for influencing the vibratory characteristics of said contact device and resistor means; and means for varying the resistance value of said resistor means to control the voltage of said generator.

References Cited in the file of this patent

UNITED STATES PATENTS

| Re. 19,738 | McNeil | Oct. 22, 1935 |
| 1,189,182 | Thompson | June 27, 1916 |
| 1,196,778 | Henderson | Sept. 5, 1916 |
| 1,353,060 | Milnor | Sept. 14, 1920 |
| 1,394,148 | Creveling | Oct. 18, 1921 |
| 1,475,251 | Sullivan | Nov. 27, 1923 |
| 1,894,810 | Winter | Jan. 17, 1933 |
| 1,898,559 | McNeil | Feb. 21, 1933 |
| 1,984,820 | Bohli | Dec. 18, 1934 |
| 2,205,350 | Exner | June 18, 1940 |

FOREIGN PATENTS

| 16,080 | Great Britain | of 1914 |